US 6,618,334 B1

(12) United States Patent
Yamamoto

(10) Patent No.: US 6,618,334 B1
(45) Date of Patent: Sep. 9, 2003

(54) OPTICAL DISK RECORDING/ REPRODUCING DEVICE EMPLOYING WAVEFORM CORRECTION OF LASER OUTPUT SIGNAL

(75) Inventor: Tsuyoshi Yamamoto, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/703,563

(22) Filed: Nov. 1, 2000

(30) Foreign Application Priority Data

Nov. 4, 1999  (JP) ............................................ 11-313821

(51) Int. Cl.$^7$ ................................................. G11B 5/09
(52) U.S. Cl. ................................ 369/47.51; 369/53.26; 369/59.11
(58) Field of Search ........................... 369/47.5, 47.51, 369/47.53, 53.26, 53.27, 124.1, 124.15, 116, 59.17, 47.25, 53.31, 59.11, 59.15

(56) References Cited

U.S. PATENT DOCUMENTS 4,733,398 A * 3/1988 Shibagaki et al. .......... 369/116

FOREIGN PATENT DOCUMENTS

| JP | 6-76288 | 3/1994 |
| JP | 8-306054 | 11/1996 |
| TW | 373170 | 11/1999 |

* cited by examiner

Primary Examiner—Paul W. Huber
(74) Attorney, Agent, or Firm—Hogan & Hartson, LLP

(57) ABSTRACT

An optical disk recording/reproducing device which records a signal on a disk using a laser beam irradiated from a laser element driven by a pulse signal, wherein an average level detector circuit (70) detects an average level of a monitor signal obtained when a basic pulse signal is applied to the laser element, and an average level of a monitor signal of a reference basic pulse signal is stored as a reference average level in advance in a memory (15). During an actual recording operation, writing in a trial writing region is performed. During the trial writing, a system control circuit (9) compares the presently detected average level to a reference average level stored in the memory (15), and corrects waveform of the basic pulse signal by adjusting a peak level and or a bottom level of the basic pulse signal to be output such that the detected average level matches the reference average level.

4 Claims, 4 Drawing Sheets

OPTICAL DISK RECORDING/ REPRODUCING DEVICE EMPLOYING WAVEFORM CORRECTION OF LASER OUTPUT SIGNAL

BACKGROUND OF THE INVENTION

1. Field of the Invention

The present invention relates to an optical disk recording/ reproducing device for recording a signal on a disk using a laser irradiated from an optical pickup, and for reproducing such a signal recorded on a disk using a laser.

2. Description of the Background Art

Disk players for executing readout of signals recorded on a disk using an optical pickup are widely used. Recently, optical disk recording/reproducing devices are commercially available, which are designed for performing, in addition to reproduction, recording of signals on a disk by a laser irradiated from an optical pickup unit.

In such an optical disk recording/reproducing device, a pit is created on a disk using a laser beam. When the laser output is inappropriate, the pit size becomes too large or too small. To prevent this problem, a disk used in an optical disk recording/reproducing device includes a trial writing region on the innermost track side. After recording a signal in the trial writing region, the signal is reproduced and detected, and the output of the laser for recording is set according to the detected signal. This technique is disclosed, for example, in Japanese Patent Laid-Open Publication No. Hei 6-76288.

Using a laser output set as described above, a signal is then recorded in a data signal recording region provided on the disk. The signal recording operation is executed by applying to a laser element a pulse signal having a waveform as indicated by a solid line in FIG. 3(d).

A signal is recorded on a disk by creating a pit in a signal track on the disk using a light beam output from a laser element, and the pit is formed in a prescribed size. The signal recording operation is executed while rotating the disk at a predetermined constant linear velocity. In some of the recently commercialized optical disk recording/reproducing devices, the linear velocity for the rotation during signal recording operation can be increased to several times the predetermined linear velocity.

The pulse signal applied to the laser element is configured to have as in the waveform shown in FIG. 3(d), a peak level VP for executing a recording operation, a bottom level VB for executing a reproduction operation, and a land level, namely, an erasing level VE, for erasing a signal recorded on the disk. Laser output is varied corresponding to each level of the pulse signal. It is therefore necessary to accurately set each level of the pulse signal.

The levels constituting the pulse signal are adjusted by sampling portions having the respective levels and then adjusting based on the sampled data. When the disk rotation speed is increased, the pulse width of the pulse signal applied to the laser element for signal recording becomes reduced. Accordingly, when sampling a monitor signal obtained from a monitor diode so as to execute adjustment of laser output, the sampling time becomes shortened, resulting in a problem that level adjustment cannot accurately be performed.

As a method for solving the above problem, it is possible to obtain accurate sample data from a portion having an erasing level VE, the level in which sampling operation can be performed using a longer time, and to set the peak level VP for recording and the bottom level VB for reproducing based on the obtained data. However, setting of the erasing level VE at an optimal value does not ensure optimal setting of the peak level VP and the bottom level VB. Moreover, it is impossible to determine whether the peak level VP and the bottom level. VB designated by using the erasing level VE as the reference are actually set at their optimal values, and this limitation is causing degradation of recording quality.

SUMMARY OF THE INVENTION

An object of the present invention is to provide an improved method overcoming the above problem for setting a laser output in an optical disk recording/reproducing device.

According to the present invention, there is provided an optical disk recording/reproducing device which records a signal on a disk using a laser irradiated from a laser element driven by a pulse signal, wherein an average level of a monitor signal obtained when a basic pulse signal is applied to the laser element is detected, the presently detected average level is compared to a predetermined reference average level of a monitor signal of a reference basic pulse signal, and waveform of the basic pulse signal is corrected by adjusting a peak level and/or a bottom level of the basic pulse signal such that the detected average level matches the reference average level.

According to another aspect of the present invention, in the above optical disk recording/reproducing device, an average level of the monitor signal of the reference basic pulse signal is obtained and stored prior to recording. When recording a basic pulse signal in a trial writing region of the optical disk, an average level of a monitor signal of the basic pulse signal is detected, and the detected average level is compared to the average level stored in advance to perform waveform correction of the basic pulse signal.

In a further aspect of the present invention, there is provided an optical disk recording/reproducing device which records a signal on a disk using a laser irradiated from a laser element driven by a pulse signal, comprising a detector for detecting an average level of a monitor signal obtained when a basic pulse signal is applied to the laser element, a storing unit for storing, in advance, an average level of a monitor signal of a reference basic pulse signal; and a controller for comparing the presently detected average level to a predetermined reference average level corresponding to the stored average level, and for correcting waveform of the basic pulse signal by adjusting a peak level and/or a bottom level of the basic pulse signal to be output such that the detected average level matches the reference average level.

In a still further aspect of the present invention, in the above optical disk recording/reproducing device, the storing unit further stores data concerning a relationship of a peak level and an erasing level with respect to the average level in the basic pulse signal, and data concerning a relationship of the erasing level and a bottom level with respect to the average level.

In another aspect of the present invention, in the above optical disk recording/reproducing device, an average level obtained from a monitor signal of the reference basic pulse signal is stored in advance in the storing unit. When recording the basic pulse signal in a trial writing region of the optical disk, the detector detects the average level of the monitor signal of the basic pulse signal, and the controller compares the detected average level to the average level stored in advance to perform waveform correction of the basic pulse signal.

By performing the above-described processing, the waveform, especially the peak level, of the pulse signal actually being applied to the laser element during recording can be controlled to an appropriate value without actually detecting the peak level of the pulse signal.

According to a further aspect of the above optical disk recording/reproducing device of the present invention, when recording a pulse signal in an actual recording region of the optical disk, an output level of the basic pulse signal after waveform correction is adjusted such that the erasing level of the basic pulse signal is maintained at a predetermined level.

According to the correction processing as described above which can be executed using a simple arrangement, a basic pulse signal having an appropriate waveform, especially an appropriate peak level, set in advance based on an average level can be output to the laser element during actual recording.

DESCRIPTION OF PREFERRED EMBODIMENT

Figure 1:
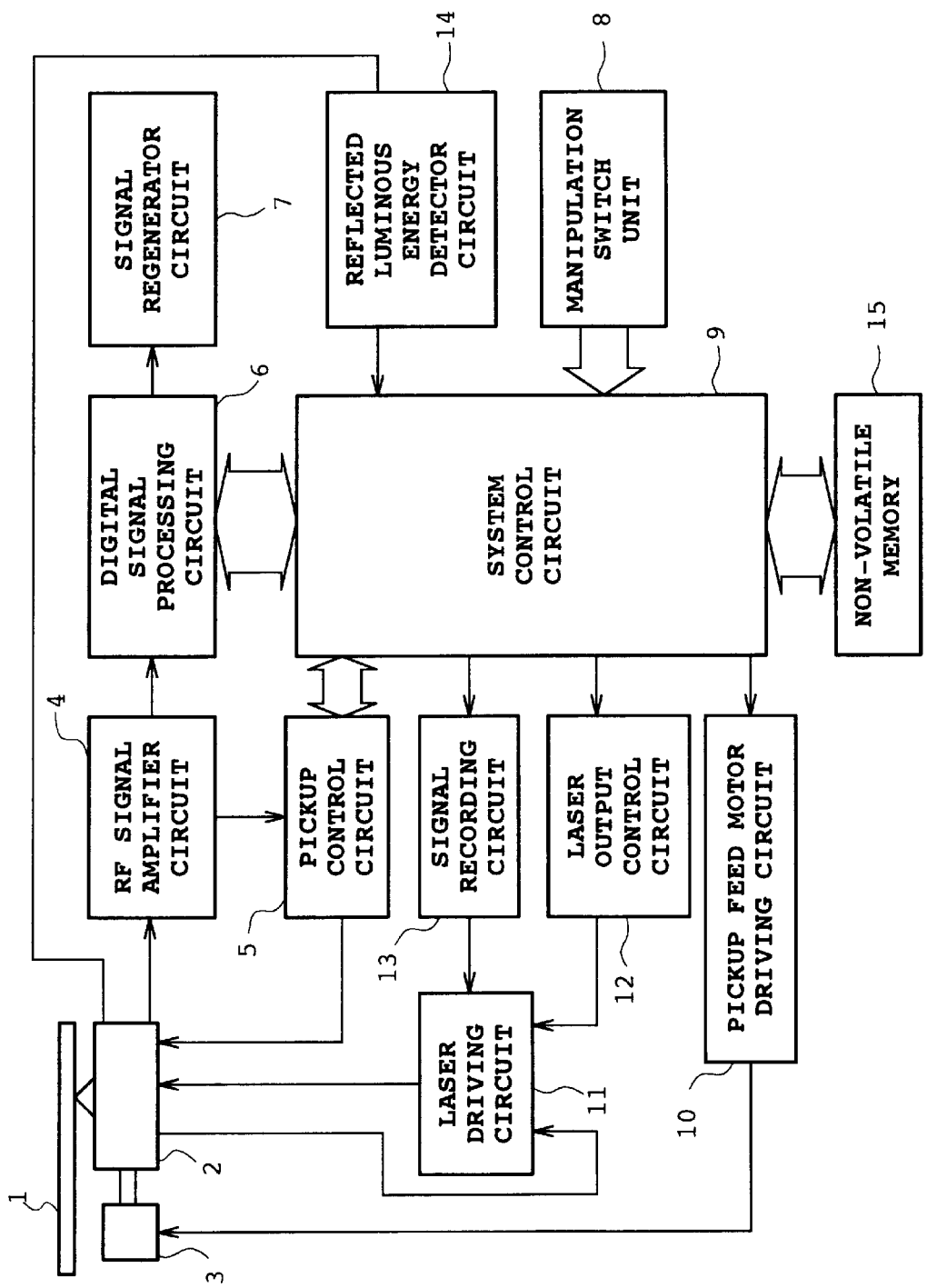
FIG. 1 is a diagram illustrating an example configuration of an optical disk recording/reproducing device according to an embodiment of the present invention.

FIG. 1 is a block diagram illustrating an example embodiment of an optical disk recording/reproducing device according to the present invention. In the figure, reference numeral 1 denotes an optical disk placed on a turntable (not shown) rotationally driven by a spindle motor (not shown). The disk is rotated by the rotation of the turntable. In the disk 1, positional information data is recorded by pregroove. The present device is configured such that signal recording/reproducing operation is performed based on a wobble signal obtained from the groove.

Reference numeral 2 denotes an optical pickup. The optical pickup 2 includes a laser element for irradiating a light beam onto the disk 1, and a light detector for receiving a light beam reflected off of a signal recording surface of the disk 1. The optical pickup 2 further includes a reflector and a monitor diode. Light irradiated by the laser element is reflected by the reflector, and the reflected light becomes the monitor signal to be irradiated on the monitor diode.

Reference numeral 3 denotes a pickup feed motor for displacing the optical pickup 2 in the radial direction of the disk 1.

Numeral 4 denotes a RF signal amplifier circuit for amplifying and performing waveform shaping on a RF signal obtained from the light detector integrated in the optical pickup 2. Numeral 5 denotes a pickup control circuit for performing a focusing control to focus a light beam from the optical pickup 2 on the signal surface of the disk 1 based on a signal obtained via the RF signal amplifier circuit 4, and for performing a tracking control to allow the light beam to trace a signal track on the signal surface.

Numeral 6 denotes a digital signal processing circuit for performing digital signal processing on a signal output from the RF signal amplifier circuit 4, and for demodulating various signals. Numeral 7 denotes a signal regenerator circuit which receives input of a digital signal processed by the digital signal processing circuit 6. When the information recorded on the disk 1 is an audio signal, the signal regenerator circuit 7 converts the input signal into an analog signal and outputs the analog signal to an amplifier or the like. When the information on the disk 1 is a data signal, such as a computer program, the signal regenerator circuit 7 outputs the input signal to a computer device in its present from as a digital signal.

Numeral 8 denotes a manipulation switch unit including switches manipulated for switching among various operations of the optical disk recording/reproducing device. Numeral 9 denotes a system control circuit for receiving input of a signal demodulated by the digital processing circuit 6, and for performing various controls according to manipulations of the manipulation switch unit 8. Numeral 10 denotes a pickup feed motor driving circuit for driving and controlling the rotation of the pickup feed motor 3. The operation of the pickup feed motor driving circuit 10 is controlled by the system control circuit 9.

11 denotes a laser driving circuit for supplying a pulse signal for driving a laser element included in the optical pickup device 2. 12 denotes a laser output control circuit, the operation of which is controlled by the system control circuit 9. The laser output control circuit 12 controls the laser driving circuit 11 to set the laser output. Reference numeral 13 denotes a signal recording circuit for receiving input oft a recorded signal of a test signal or a information signal, and for controlling, according to the received signal, the laser irradiating operation of the laser driving circuit 11 to allow recording of a signal on the optical disk 1.

Reference numeral 14 is a reflected luminous energy detector circuit. The reflected luminous energy detector circuit 14 receives input of a monitor signal generated using the monitor diode integrated in the optical pickup 2, and detects the level of the monitor signal to determine the reflected luminous energy level (erasing level VE) of a basic pulse signal as described later. Further, an average level detector circuit 70 provided inside the reflected luminous energy detector circuit 14 detects the average level VA of the monitor signal. The detected values are supplied to the system control circuit 9.

Reference numeral 15 is a storage unit comprising, for example, a non-volatile memory. The storage unit 15 is used especially for storing the average level VA and the erasing level VE of the monitor signal generated when a predetermined basic pulse signal is output in advance to the laser element, as described later.

The reproducing operation of the optical disk recording/reproducing device according to the present invention having the above-described configuration is next described. When a manipulation switch for reproduction provided in the manipulation switch unit 8 is turned on, the system control circuit 9 starts a control for reproduction. When performing a reproducing operation, the device setting is such that the laser element included in the optical pickup 2 is supplied with a drive current from the laser drive circuit 11 to obtain a laser output required for signal readout.

With the start of the control for reproduction, a spindle motor driving circuit (not shown) performs rotation control of the spindle motor. In addition, the optical pickup 2 begins the focusing operation and the tracking operation to read out a signal from the disk 1. The signal read out by the optical pickup 2 is input to the digital signal processing circuit 6 via the RF signal amplifier circuit 4. The digital signal processing circuit 6 executes a signal processing to extract information data. After the information data is processed for error correction and the like, the data is applied to the signal regenerator circuit 7.

When the information data is an audio signal, the signal regenerator circuit 7 converts the data into an analog signal and then outputs the analog signal to an amplifier or the like. When the information data is a data signal such as a computer program, the signal regenerator circuit 7 outputs the input signal to a computer device as is in the form of a digital signal.

In the circuit configuration described above, laser output setting operation is first conducted when a disk 1 is inserted in a disk mounting portion to perform signal recording. The laser output setting operation is executed by setting the laser output to various output levels according to the basic laser output data stored in advance in a memory circuit (not shown) provided inside the system control circuit 9. Using these laser output levels, test signals are recorded in a trial writing region located on the innermost track side. Each of the recorded test signals is reproduced, and, from among those signals, a signal recorded in the best condition is determined. The laser output used for the determined signal is then designated as the optimal laser output, completing the laser output setting operation. Before or after this laser output setting operation, waveform correction is performed based on the average value VA of the peak and bottom levels of the basic pulse signal (basic laser output data) to adjust the peak level and the bottom level to the optimal levels.

When the above setting operation is completed, recording in the signal recording region of the disk 1 is started. This recording is performed using the laser output set by the above operation. During this signal recording operation, changes in light reflected by the disk 1 is monitored to accordingly alter the value of the drive current supplied to the laser element from the laser driving circuit 11, so as to constantly adjust the laser output level (power) to a level appropriate for the recording operation. This laser output adjustment is performed by sampling the erasing level VE portions, and by setting the peak level VP and the bottom level VB based on data obtained from the sampling.

Figure 2:
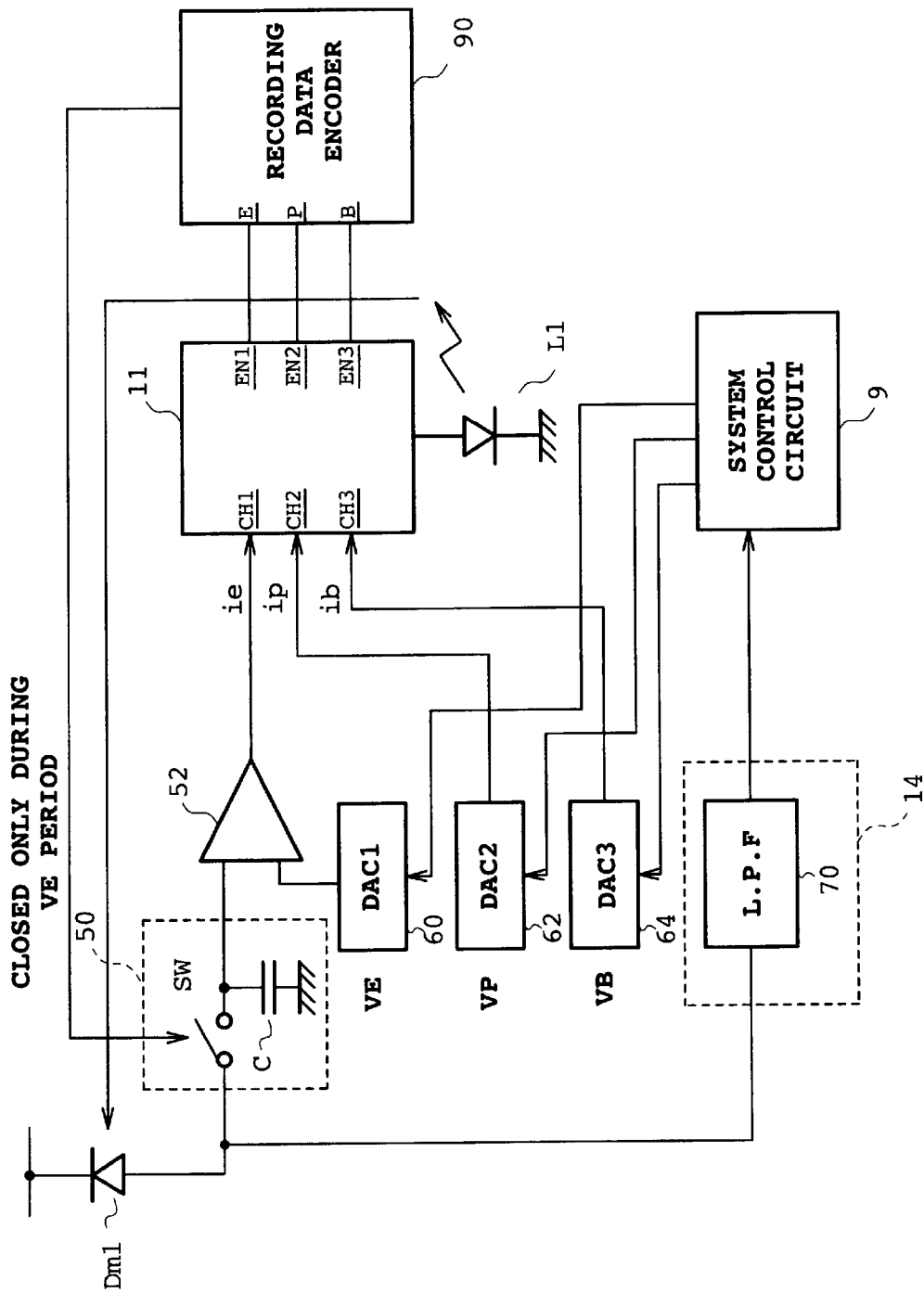
FIG. 2 is a diagram illustrating an example configuration of the section for executing basic pulse signal generation and waveform correction in an optical disk recording/reproducing device according to an embodiment of the present invention.

FIG. 2 is an example configuration of the section which executes the waveform correction of the output pulse signal according to the present invention. When a pulse signal from the laser driving circuit 11 is supplied to the laser element L1 of the above-described pickup 2, the laser element L1 emits light. The monitor diode Dm1 of the pickup 2 receives the light and generates a current according to the received light intensity.

This current is supplied as the monitor signal to one of the input terminals of a comparator 52, via a switch SW and a capacitor C in a sample hold unit 50. A recording data encoder 90 controls the switch SW to be closed only during the erasing level VE portions of the basic pulse signal. The comparator 52 is therefore supplied with only the erasing level VE portions of the monitor signal. Supplied to the other input terminal of the comparator 52 is an analog output from a first digital-analog (D/A) converter circuit 60. The first D/A converter circuit 60 receives input of digital data corresponding to the erasing level VE portions from the system control circuit 9 of FIG. 1 configured with a microcomputer and other components. The first D/A converter circuit 60 then supplies the corresponding analog erasing level VE portions to the comparator 52. As a result, the comparator 52 compares the erasing level VE of the monitor signal and the erasing level VE according to an instruction from the system control circuit 9, and supplies, to terminal CH1 of the laser driving circuit 11, a current value ie as an erasing level signal for reducing the difference between the two erasing levels VE. In this way, a feedback is provided for the erasing level VE of the basic pulse signal.

Data corresponding to the peak level VP portions is supplied to the second D/A converter circuit 62 from the system control circuit 9. The data is converted into a corresponding analog current value ip in the second D/A converter circuit 62, and output to terminal CH2 of the laser driving circuit 11. Data corresponding to the bottom level VB portions is supplied to the third D/A converter circuit 64 from the system control circuit 9. The data is converted into a corresponding analog current value ib in the third D/A converter circuit 64, and output to terminal CH3 of the laser driving circuit 11.

The monitor signal from the monitor diode Dm1 is supplied to the average level detector circuit 70 provided inside the reflected luminous energy detector circuit 14. In the present embodiment, the detector circuit 70 is configured using a low-pass filter. The low-pass filter 70 detects the average level VA of the monitor signal corresponding to the luminous energy generated at the laser element L1. This average level VA is supplied to the system control circuit 9.

The laser driving circuit 11 receives, via its input channel terminals CH1~CH3, the erasing level signal ie, the peak level signal ip, and, the bottom level signal ib, respectively. In addition, terminals EN1, EN2, and EN3 of the laser driving circuit 11 are supplied with outputs from terminals E, P, and B of the recording data encoder 90, respectively. The laser driving circuit 11 outputs to the laser element L1 the current signals ie, ip, and ib supplied to the terminals CH1, CH2, and CH3 only when the corresponding outputs E, P, or B supplied to the terminals EN1~EN3 are at level H (high).

Figure 3:
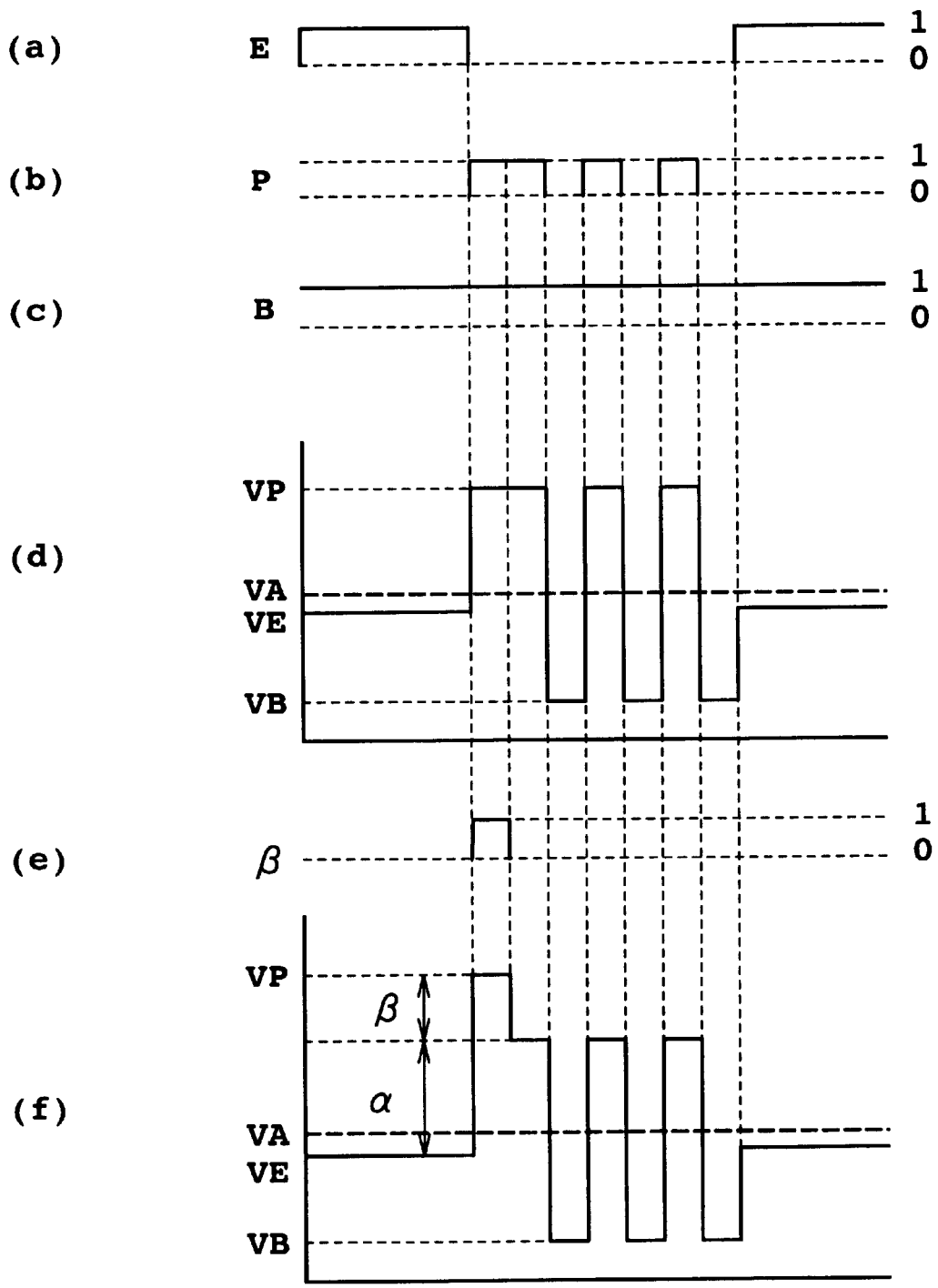
FIG. 3 is a diagram for explaining a method for producing the basic pulse signal.

The above process will next be described in detail using FIG. 3. The basic pulse signal, which is generated by the laser driving circuit 11 and output to the laser element L1, has a waveform as shown in FIG. 3(d). Output B remains a constant "1" as indicated in FIG. 3(c). Accordingly, the laser driving circuit 11 constantly outputs the bottom level signal ib supplied to terminal CH3. The bottom level VB of the basic pulse signal is thus determined. Referring to FIG. 3(a), when output E from the encoder 90 is "1", the erasing level signal ie supplied to terminal CH1 of the laser driving circuit 11 is permitted to be output. During this period, the current value of "ib+ie" is output to the laser element L1, thereby determining the erasing level VE of the basic pulse signal. Furthermore, referring to FIG. 3(b), the peak level signal ip supplied to terminal CH2 is permitted to be output when output P is "1". During this period, the current value of "ib+ip" is output to the laser element L1, thereby determining the peak level VP of the basic pulse signal.

In this manner, each level of the basic pulse signal as shown in FIG. 3(d) is determined according to the output data from the system control circuit 9.

When subsequently recording the basic pulse signal in the trial writing region of the disk 1 in the present embodiment, as described below in detail, the system control circuit 9 calculates, based on the "average level VA" of the monitor signal obtained from the average level detector circuit 70, peak level VP and bottom level VB values which should be maintained at a fixed relationship with respect to the erasing level VE detected from the monitor signal. The system control circuit 9 then sets these values in the D/A converter circuits 62 and 64. Through this process without directly sampling the peak level VP, the peak level VP and the bottom level VB of the basic pulse signal used for actual recording can be set at optimal values, allowing adjustment of the waveform of the basic pulse signal to a desired waveform.

The method for correcting waveform of the basic pulse signal using the average level VA is next described.

In the present embodiment, during manufacture of the optical disk recording/reproducing device, a reference basic pulse signal having a waveform as shown in FIG. 3(d), namely, a pulse signal with its erasing level VE, peak level VP, and preset bottom level VB, is applied to the laser element L1. A monitor signal is then obtained from the monitor diode Dm1 which receives the light irradiated from the laser element L1. The reflected luminous energy detector circuit 14 detects the average level VA of this monitor signal using the average level detector circuit 70. Meanwhile, the sample hold unit 50 samples the erasing level VE to perform servo operation, allowing execution of the control for maintaining the erasing level VE at a fixed level. Detection of the average level VA is performed while this control is executed. The detected average level VA is stored in the non-volatile memory 15. Further, by storing in the non-volatile memory 15 the erasing level VE, peak level VP and bottom level VB of the basic pulse signal used for the average level detection, waveform correction operation can speedily be executed as described below.

Figure 4:
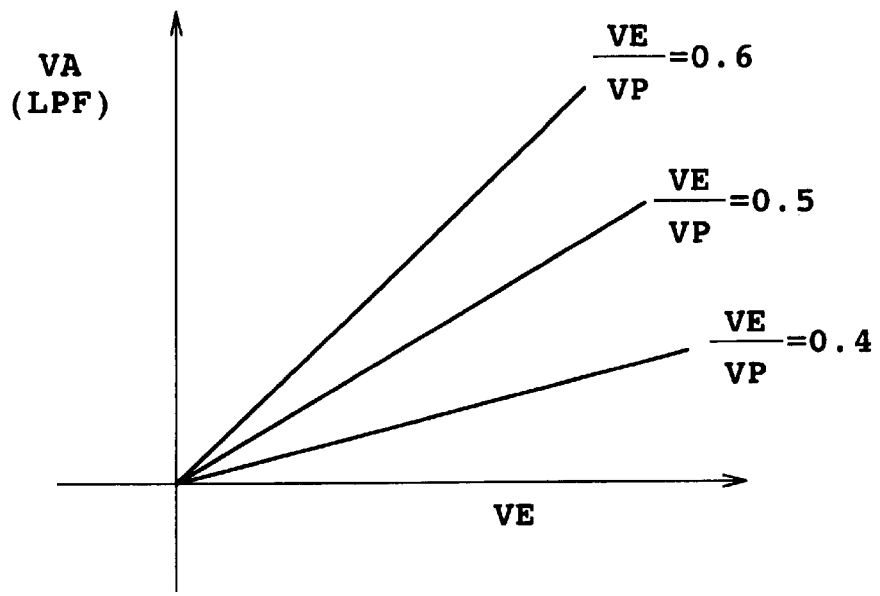
FIG. 4 is a diagram showing a relationship between the average level VA and the erasing level VE/peak level VP.
Figure 5:
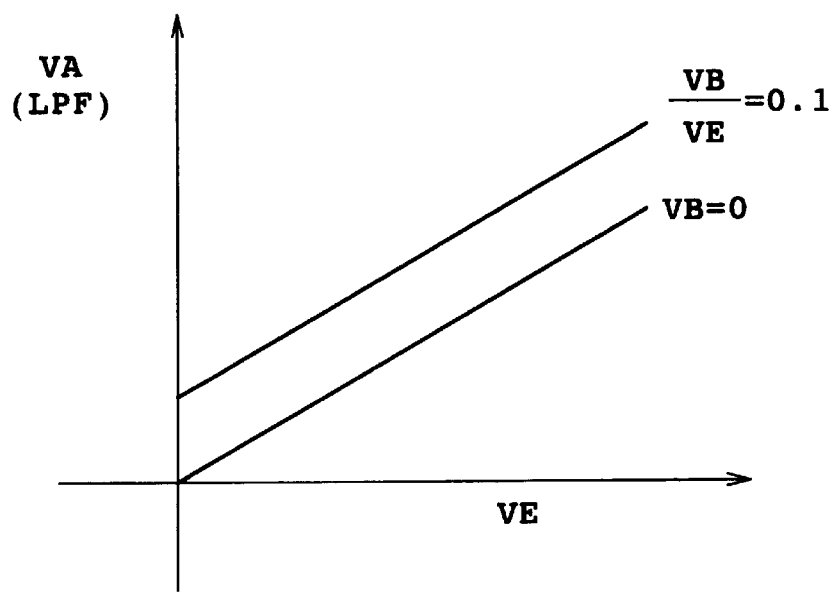
FIG. 5 is a diagram showing a relationship between the average level VA and the bottom level VB/erasing level VE.

Further, in the present embodiment, relationships as shown in FIGS. 4 and 5 for example, namely, the relationship in the basic pulse signal between the erasing level VE and the peak level VP and the relationship between the erasing level VE and the bottom level VB, are determined in advance. These relationships are stored in a memory (ROM) inside the system control circuit 9 as a table or relational expressions.

FIG. 4 shows the relationship between the average level VA and the erasing level VE in monitor signals of the basic pulse signals having different waveforms between VP and VE. More precisely, FIG. 4 illustrates a relationship within a basic pulse signal between the average level VA (LPF output) and the erasing level VE resulting when the direct current bottom level VB component is "0". As shown, the two levels VA and VE are in a proportional relationship, and the slope a is equal to the ratio of the erasing level VE to the peak level VP (VE/VP). Accordingly, even when an identical erasing level VE is detected, the detected average level VA may differ according to the magnitude of the peak level VP with respect to the erasing level VE.

FIG. 5 shows the relationship between the average level VA and the erasing level VE in monitor signals of the basic pulse signals having different waveforms between VE and VB. Because the bottom level VB component is a direct current component as described above, when the value of the bottom level VB is varied in a monitor signal of a basic pulse signal having the same VP-VE relationship, the average level of the monitor signal is linearly changed. In other words, the relationship of FIG. 5 is such that the intercept component b increases while the proportional relationship between the detected average level VA and the erasing level VE remains fixed. The relationships between the average level VA and the erasing level VE as shown in FIGS. 4 and 5 are stored as a table or relational expressions at the time of manufacture of the device in the memory (ROM) integrated within the system control circuit 9.

During an actual signal recording operation, setting of laser output is first conducted through recording of a test signal in a trial writing region provided on the innermost track side of the disk. This trial recording is performed using the basic pulse signal employed for the adjustment process at the time of manufacture. During the trial recording operation, the average level detector circuit 70 in the reflected luminous energy detector circuit 14 detects an average level VA of the monitor signal obtained from the monitor diode Dm1, and the sample hold circuit 50 detects the erasing level VE through sampling.

Subsequently, based on the detected average level VA and the erasing level VE, data to be set in each of the D/A converter circuits 60, 62, 64 are determined so as to allow adjustment of the peak level VP, bottom level VB, and erasing level VE of the basic pulse signal to their respective desired values. In this example, it is assumed that the basic pulse signal stored during manufacture of the device has the level (power) of erasing level VE at 10 mW, and a waveform having a VP-VE relationship expressed as VE/VP=0.5. Further, it is assumed that the required power (erasing level) for writing in the trial writing region is 6 mW.

Processing for this example can be outlined as follows. The system control circuit 9 first reads out from the non-volatile memory 15 a value of average level VA (LPF output) which fulfills the erasing level VE of 10 mW and VE/VP=0.5. By multiplying 6 mw/10 mw to the read-out average level VA value, a target value of average level VA that should be obtained when the erasing level is 6 mW can be calculated. Based on this data, required peak level VP and bottom level VB are calculated, and values to be output to the second and third D/A converter circuits 62 and 64 are determined.

More specifically, data corresponding to the target erasing level VE value of 6 mW is set in the first D/A converter circuit 60, and the laser servo loop performs control to adjust the erasing level VE of the monitor signal to 6 mW. When, for example, the bottom level VB is set to 1 mW, the actual erasing level VE becomes 7 mW as shown in FIG. 3(d) because of the additional 1 mW. The value of average level VA corresponding to this erasing level VE of 7 mW is equal to 7/6 times the average level VA obtained when the erasing level VE is 6 mW. The value of erasing level VE corresponding to this 7/6 average level VA value (LPF output) can then be calculated. Based on this value of erasing level VE, the system control circuit 9 calculates data to be output to the third D/A converter circuit 64. This calculated value is temporarily determined as the data to be output to the third D/A converter circuit 64.

Subsequently, a value of average level VA for a waveform fulfilling VE/VP=0.5 and having VE of 10 mW and VB=0 is read out. Data to be output to the second D/A converter circuit 62 (i.e., the output peak level VP) is adjusted until the actual average level VA obtained in the average level detector circuit 70 in connection with the monitor signal having the waveform concerned (provided that VB=0) matches the target average level VA value obtained by multiplying 6 mW/10 mW to the read-out average level value. The data which realizes the target average level VA is temporarily determined as the data to be supplied to the second D/A converter circuit 62.

In this way, data to be output to the first D/A converter circuit 60, the second D/A converter circuit 62, and the third D/A converter circuit 64 (i.e., the erasing level VE, peak level VP, and bottom level VB) are temporarily determined. Based on the determined data, a basic pulse signal is generated through timing control as shown in FIG. 3(a)–(c), and is output to the laser element L1. The average level detector circuit 70 then detects the average level VA of the monitor signal obtained from the monitor diode Dm1. The system control circuit 9 compares the detected average level VA to a reference average level VA, which is the value obtained by correcting the average level VA stored in advance in the non-volatile memory 15 during manufacture. Data to be output to the second D/A converter circuit 62 (i.e., the output peak level VP) is adjusted until the detected average level VA matches the reference average level VA. Depending on the difference between the reference average level VA and the detected average level VA, data to be output to the third D/A converter circuit 64 (i.e., the output bottom level VB) is further changed when necessary.

During trial writing into the trial writing region, each of the levels in the output basic pulse signal as shown in FIG. 3(d) is set by the correction processing as described above, and the pulse signal waveform is corrected accordingly. During the subsequent recording operation in the recording region, the basic pulse signal having the waveform determined by this waveform correction processing is constantly output. In order to adjust the laser output power to an optimal level according to the luminous energy presently reflected off of the disk, as described above, servo processing is executed to shift the level of the entire waveform-corrected basic pulse signal without changing the relationship among the respective levels in the signal.

In the above-described manner, waveform of the pulse signal for recording is corrected based on a table or relational expressions stored in the memory (ROM). However, when the average level VA detected during the recording operation matches the average level VA stored in the non-volatile memory 15, the values of erasing level VE, peak level VP, and bottom level VB stored in the non-volatile memory 15 are used to set the waveform of the pulse signal for recording. Accordingly, in such a case, there is no need to perform the calculation processing for each level, allowing speedup of the waveform correction operation.

The basic pulse signal output for recording operation in the optical disk recording/reproducing device is not limited to a pulse having a waveform as shown in FIG. 3(d). Rather, in practice, a waveform as shown in FIG. 3(f) is frequently used.

In the waveform of FIG. 3(f), a level reached by adding $\beta$ to "VE+$\alpha$" is used as the initial recording level (i.e., peak level VP), so as to steeply raise the temperature of the recording portion of the disk 1 at the start of recording. After that, the peak level VP is "VE+$\alpha$".

When using such a waveform, the $\alpha$ and $\beta$ can be corrected to optimal values, before the start of recording in the actual recording region, through a processing identical to the above waveform correction of the basic pulse signal of FIG. 3(d). Addition of $\beta$ to "VE+$\alpha$" in the initial peak level of the basic pulse signal can be realized by providing, in the laser output control circuit 11, a terminal CH4 supplied with a current value, i$\beta$ corresponding to $\beta$, and by controlling this terminal by using the output $\beta$ shown in FIG. 3(e) obtained from the recording data encoder 90.

The value $\beta$ can be corrected as follows. Stored in the non-volatile memory 15 at the time of manufacture are an average level VA2 detected in a monitor signal of a basic pulse signal having a predetermined amount of $\beta$ added, and an average level VA1 detected in a monitor signal of the basic pulse signal without the $\beta$. When recording in the trial writing region at the time of actual recording operation, an average level VAd is detected in a monitor signal of the output basic pulse signal. Adjustment of the amount of $\beta$ to be added can then be executed by referring to this level VAd and the above average levels VA1 and VA2. In this way, a basic pulse signal having a desired power can be adjusted to an optimal value based on the average level VA obtained by detecting each level in that signal.

What is claimed is:

1. An optical disk recording/reproducing device which records a signal on a disk using a laser irradiated from a laser element driven by a pulse signal, wherein an average level of a monitor signal obtained when a basic pulse signal is applied to said laser element is detected, the presently detected average level is compared to a predetermined reference average level of a monitor signal of a reference basic pulse signal, wherein an average level of said monitor signal of said reference basic pulse signal is obtained and stored in advance of recording, and when recording said basic pulse signal in a trial writing region of the optical disk, the average level of the monitor signal of said basic pulse signal is detected, and the detected average level is compared to said average level stored in advance to perform waveform correction of said basic pulse signal; and waveform of said basic pulse signal is corrected by adjusting a peak level and/or a bottom level of said basic pulse signal such that the detected average level matches said reference average level.

2. An optical disk recording/reproducing device which records a signal on a disk using a laser irradiated from a laser element by a pulse signal, comprising:

a detector for detecting an average level of a monitor signal obtained when a basic pulse signal is applied to said laser element;

a storing unit for storing, in advance, an average level of a monitor signal of a reference basic pulse signal, said storing unit further stores data concerning a relationship of a peak level and an erasing level with respect to said average level in said basic pulse signal, and data concerning a relationship of the erasing level and a bottom level with respect to said average level; and a controller for comparing the presently detected average level to a predetermined reference average level corresponding to said stored average level, and for correcting waveform of said basic pulse signal by adjusting a peak level and/or a bottom level of said basic pulse signal to be output such that the detected average level matches said reference average level.

3. An optical disk recording/reproducing device which records a signal on a disk using a laser irradiated from a laser element by a pulse signal, comprising:

a detector for detecting an average level of a monitor signal obtained when a basic pulse signal is applied to said laser element when recording said basic pulse signal in a trial writing region of the optical disk;

a storing unit for storing, in advance, an average level of a monitor signal of a reference basic pulse signal, when recording said basic pulse signal in a trial writing region of the optical disk, said detector detects the average level of said monitor signal of said basic pulse signal, and a controller for comparing the presently detected average level to a predetermined reference average level corresponding to said stored average level, and for correcting waveform of said basic pulse signal by adjusting a peak level and/or a bottom level of said basic pulse signal to be output such that the detected average level matches said reference average level, said controller compares the detected average level to said average level stored in advance to perform waveform correction of said basic pulse signal.

4. An optical disk recording/reproducing device as claimed in claim 3, wherein when recording a pulse signal in an actual recording region of said optical disk, an output level of said basic pulse signal after waveform correction is adjusted such that the erasing level of said basic pulse signal is maintained at a predetermined level.

* * * * *